US012792106B2

(12) United States Patent
Peng et al.

(10) Patent No.: US 12,792,106 B2
(45) Date of Patent: Nov. 10, 2026

(54) BIAXIAL HINGE CAPABLE OF CHANGING FOLDING SPACING

(71) Applicant: Sinher Technology Inc., New Taipei City (TW)

(72) Inventors: Chih-Huang Peng, New Taipei City (TW); Chun-Fu Lin, New Taipei City (TW); Nan-Hai Lai, New Taipei City (TW)

(73) Assignee: Sinher Technology Inc., New Taipei City (TW)

( * ) Notice: Subject to any disclaimer, the term of this patent is extended or adjusted under 35 U.S.C. 154(b) by 180 days.

(21) Appl. No.: 18/964,006

(22) Filed: Nov. 29, 2024

(65) Prior Publication Data

US 2026/0153907 A1 Jun. 4, 2026

(51) Int. Cl.
*G06F 1/16* (2006.01)

(52) U.S. Cl.
CPC .................................. *G06F 1/1681* (2013.01)

(58) Field of Classification Search
CPC ..................................................... G06F 1/1681
See application file for complete search history.

(56) References Cited

U.S. PATENT DOCUMENTS 11,989,062 B2 * 5/2024 Chang ................... G06F 1/1681

* cited by examiner

*Primary Examiner* — James Wu
(74) *Attorney, Agent, or Firm* — MUNCY, GEISSLER, OLDS & LOWE, P.C.

(57) ABSTRACT

A biaxial hinge capable of changing a folding spacing comprises a hinge body and at least one spacing adjustment mechanism. The hinge body includes a support frame and two first rotating shafts disposed parallelly on the support frame. The at least one spacing adjustment mechanism comprises a connecting rod connected to one of the first rotating shafts and rotating relative to the hinge body, a base rotating relative to the connecting rod, and a limiting unit disposed on the base. The connecting rod is provided with a limiting groove, and the limiting unit comprises a fastener corresponding to the limiting groove, and a magnetic element connected to the fastener. The fastener includes a first state that contacts the limiting groove and limits rotation of the base, and a second state that separates from the limiting groove and enables the base to rotate.

9 Claims, 9 Drawing Sheets

BIAXIAL HINGE CAPABLE OF CHANGING FOLDING SPACING

FIELD OF THE INVENTION

A biaxial hinge, more particularly a biaxial hinge capable of changing a folding spacing.

BACKGROUND OF THE INVENTION

Existing dual-screen devices generally adopt a biaxial hinge structure. When the dual-screen device is folded, it often cannot accommodate the keyboard inside, which affects the convenience of carrying the device for users. To address this issue, some manufacturers have designed biaxial hinges with an increased distance between the two axes, in order to provide sufficient storage space for the keyboard when the dual-screen device is folded. However, there is still a significant problem with this design since when the user does not store the keyboard in the dual-screen device, an unfilled gap will be formed during the folding process of the dual-screen device.

Accordingly, the development of a biaxial hinge that allows for adjustable folding spacing is a critical challenge that needs to be addressed in the industry.

SUMMARY OF THE INVENTION

A main object of the invention is to solve the problem that the conventional biaxial hinge structure cannot change a folding spacing.

In order to achieve the above object, the invention provides a biaxial hinge capable of changing a folding spacing, comprising a hinge body and at least one spacing adjustment mechanism. The hinge body includes a support frame and two first rotating shafts disposed parallelly side by side on the support frame. The at least one spacing adjustment mechanism includes a connecting rod connected to one of the first rotating shafts and rotating relative to the hinge body, a base connected to the connecting rod and rotating relative to the connecting rod, and a limiting unit disposed on the base. The connecting rod includes a limiting groove that cooperates with the limiting unit, and the limiting unit comprises a fastener disposed corresponding to the limiting groove, and a magnetic element connected to the locking element. The fastener is in a first state to contact the limiting groove and limit a rotation of the base relative to the connecting rod, and the fastener is in a second state to separate from the limiting groove and enable the base to rotate relative to the connecting rod. When the fastener is in the second state, the biaxial hinge is provided to change a folding spacing, and the magnetic element is acted upon by an external magnetic force to switch the fastener from the first state to the second state.

In one embodiment, the fastener includes a sliding base, a pin connected to one end of the sliding base, and a guide block connected to the sliding base, the pin optionally contacts the limiting groove when the fastener is switched.

In one embodiment, the base is formed with a track provided for disposing the guide block.

In one embodiment, the at least one spacing adjustment mechanism further comprises a second rotating shaft connected to the connecting rod and the base and provided for disposing the limiting unit.

In one embodiment, the base includes a step structure and a cover plate connected to the base, the step structure and the cover plate jointly form the track.

In one embodiment, the base is formed with an accommodating space for accommodating the limiting unit, and one side of the accommodating space is optionally detachable, as defined by the base.

In one embodiment, contact surfaces of the connecting rod and the base each include a limiting structure.

In one embodiment, the base has two assembly arms connected to the connecting rod, and one of the two assembly arms is provided with an interface for enabling the pin to move therein.

In one embodiment, the limiting unit comprises an elastic reset element that abuts against the fastener and the base, and the elastic reset element enables the fastener to return to the first state.

Through the implementation mode of the invention, compared with the conventional design, the invention has the following characteristics: through the design of the at least one spacing adjustment mechanism, during a folding process, by relative rotation of the base and the connecting rod, the biaxial hinge of the invention is capable of solving the problem that the conventional biaxial hinge is incapable of placing other objects into a folding gap when folding. In addition, the at least one spacing adjustment mechanism enables a user to maintain an original folding posture of the biaxial hinge without adjusting a folding spacing through disposition of the locking element.

DETAILED DESCRIPTION OF THE PREFERRED EMBODIMENTS

The detailed description and technical content of the invention are described below with reference to the accompanying drawings.

Figure 9:
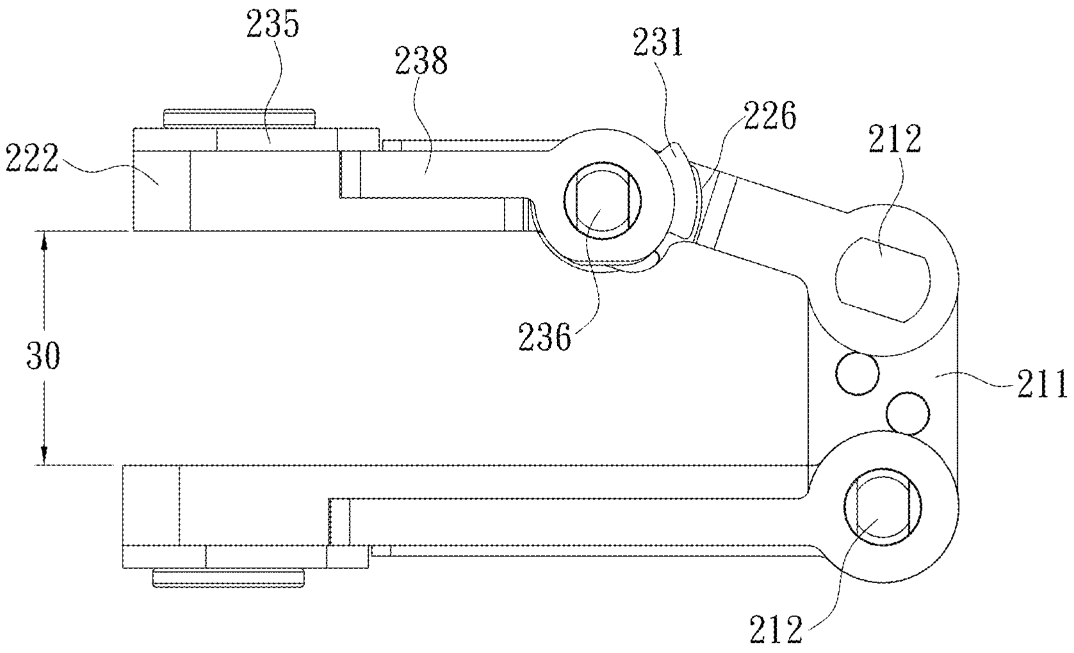
FIG. 9 is a second side view of an embodiment of the invention.
Figure 11:
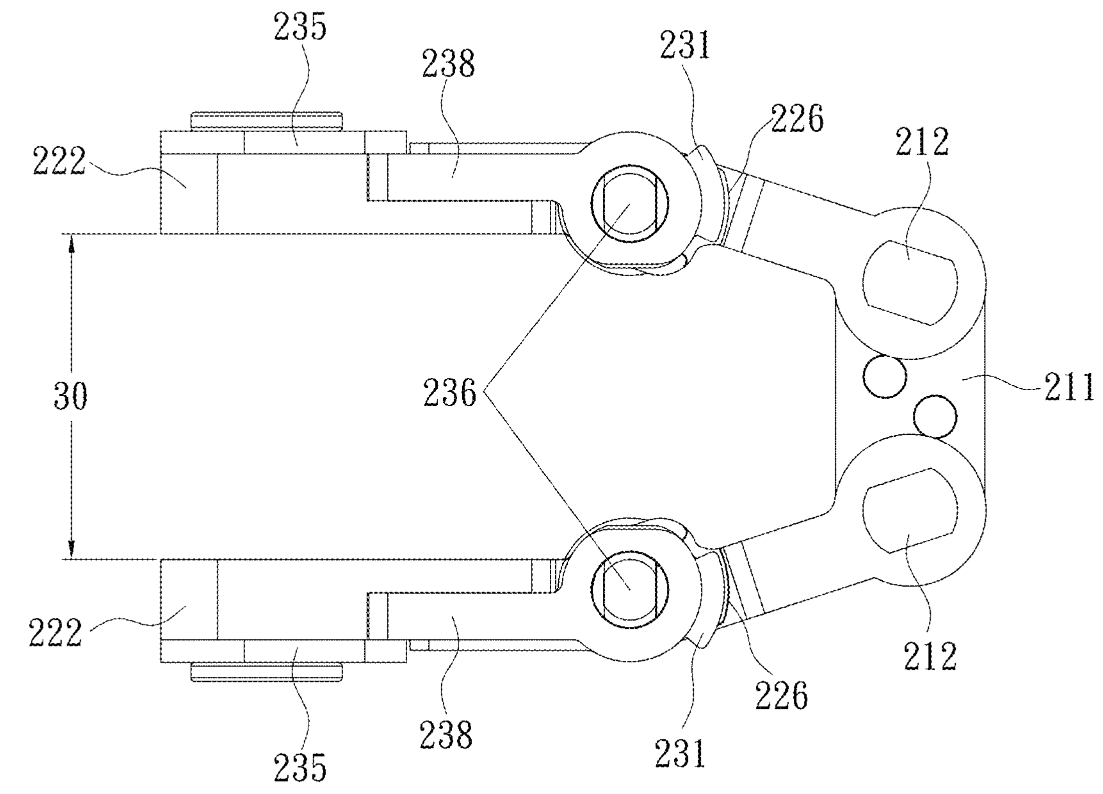
FIG. 11 is a second side view of another embodiment of the invention.
Figure 10:
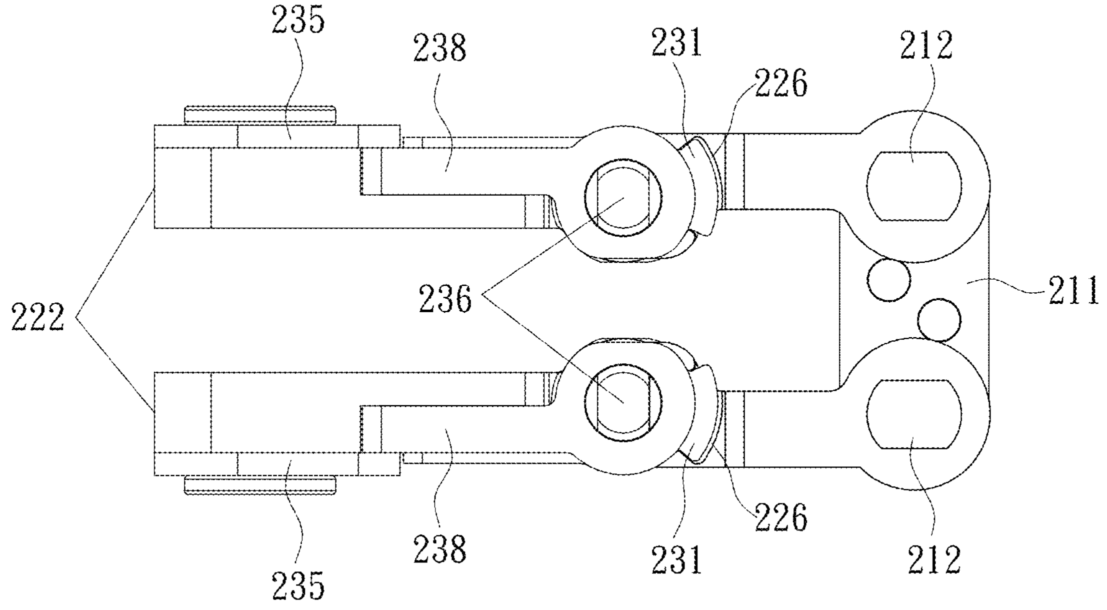
FIG. 10 is a first side view of another embodiment of the invention.

Please refer to FIG. 1, FIG. 2, FIG. 3, FIG. 4, FIG. 5, FIG. 6, FIG. 7, FIG. 8, FIG. 9. FIG. 10, and FIG. 11, the invention provides a biaxial hinge 20 capable of changing a folding spacing. The biaxial hinge 20 includes a hinge body 21 and at least one spacing adjustment mechanism 22. The hinge body 21 is provided with a support frame 211 and two first rotating shafts 212 disposed parallelly side by side on the support frame 211.

The at least one spacing adjustment mechanism 22 includes a connecting rod 221, a base 222 and a limiting unit 223. The connecting rod 221 is connected to one of the two first rotating shafts 212 and rotates relative to the hinge body 21. The base 222 is connected to the connecting rod 221 and rotates relative to the connecting rod 221. The limiting unit 223 is disposed on the base 222. The connecting rod 221 includes a second shaft connection hole 224. The second shaft connection hole 224 is provided at one end of the connecting rod 221 and is connected to one of the two first rotating shafts 212. Furthermore, the base 222 includes a shaft connection structure 225 connected to the connecting rod 221, allowing the base 222 to rotate relative to the connecting rod 221. The limiting unit 223 is used to selectively limit relative rotation between the base 222 and the connecting rod 221.

Figure 8:
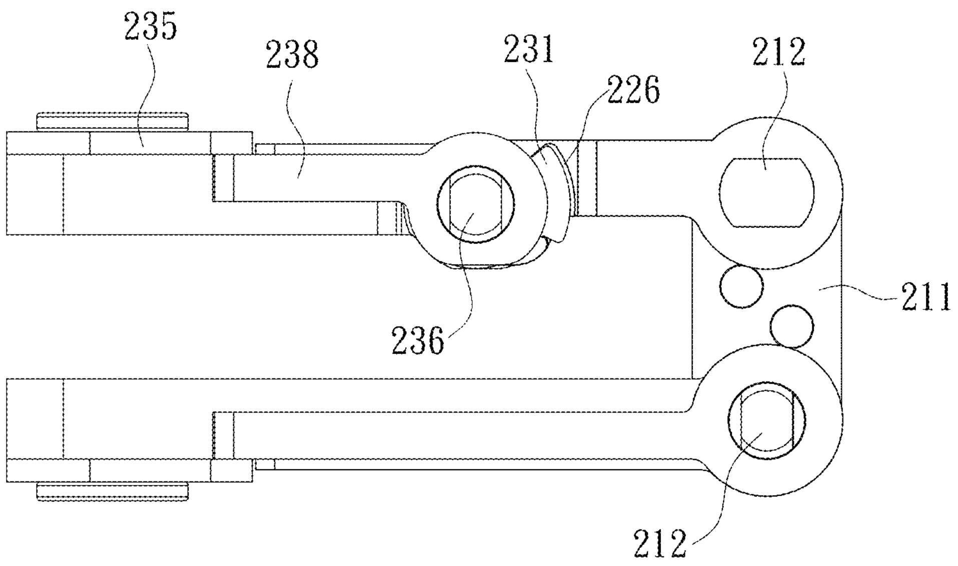
FIG. 8 is a first side view of an embodiment of the invention.

Based on the above, implementation of the limiting unit 223 will now be further described. The connecting rod 221 is provided with a limiting groove 226 that cooperates with the limiting unit 223. The limiting unit 223 includes a fastener 227 that is disposed corresponding to the limiting groove 226 and capable of selectively connecting to the limiting groove 226. The fastener 227 has the following two states according to different implementation modes respectively: a first state where the fastener 227 contacts the limiting groove 226 and restricts rotation of the base 222 relative to the connecting rod 221, and a second state where the fastener 227 separates from the limiting groove 226, enabling the base 222 to rotate relative to the connecting rod 221. In addition, the limiting unit 223 further includes a magnetic element 228 connected to the fastener 227, and the magnetic element 228 is acted upon by an external magnetic force to cause the fastener 227 to displace. Specifically, when one side of the magnetic pole of the magnetic element 228 is subjected to the external magnetic force with the same polarity, a like-pole repulsion occurs, pushing the fastener 227 to detach from the limiting groove 226. For example, when the magnetic element 228 is not acted upon by the external magnetic force, the fastener 227 can be connected to the limiting groove 226, so that the base 222 and the connecting rod 221 are in a relatively stationary state, that is, the first state as shown in FIG. 8 or FIG. 10. On the contrary, when the magnetic element 228 is acted upon by the external magnetic force, the fastener 227 can be switched from the first state to the second state, thereby releasing restriction between the base 222 and the connecting rod 221, as shown in FIG. 9 or FIG. 11.

Please refer to FIG. 4, FIG. 5, FIG. 6, FIG. 7, FIG. 8, FIG. 9. FIG. 10, and FIG. 11, for explanation of implementation of the biaxial hinge 20. It is assumed that in an initial state, the fastener 227 of the biaxial hinge 20 is in the first state that restricts rotation of the base 222 relative to the connecting rod 221. At the same time, the biaxial hinge 20 is capable of achieving an unfolded or a folded posture based on the first rotating shaft 212. Furthermore, if the external magnetic force approaches the magnetic element 228 and causes the fastener 227 to reach the second state, the biaxial hinge 20 forms a larger spacing (such as reference numeral 30) during a folding process through relative rotation between the base 222 and the connecting rod 221. Further, an object can be placed in the spacing 30.

It should be understood that a function of changing a folding spacing of the biaxial hinge 20 of the invention can have the following two implementations: unilateral implementation and bilateral implementation. When the biaxial hinge 20 is implemented in a unilateral manner, a number of the at least one spacing adjustment mechanism 22 is one and is disposed on one of the two first rotating shafts 212. Further, when the biaxial hinge 20 is folded, the spacing 30 will be formed by the spacing adjustment mechanism 22 (as shown in FIG. 8 and FIG. 9). Similarly, when the biaxial hinge 20 is implemented bilaterally, a number of the at least one spacing adjustment mechanism 22 is two, and the two spacing adjustment mechanisms 22 are connected to one of the two first rotating shafts 212 respectively. Further, when the biaxial hinge 20 is folded, the spacing 30 will be formed by the two spacing adjustment mechanisms 22 (as shown in FIG. 10 and FIG. 11).

It can be known from the above that through the design of the at least one spacing adjustment mechanism 22 of the invention, during a folding process, by relative rotation of the base 222 and the connecting rod 221, the biaxial hinge 20 of the invention solves the problem that the conventional biaxial hinge is incapable of placing other objects into a folding gap when folding. For example, when the biaxial hinge 20 is applied to a dual-screen device, the dual-screen device can form enough space to accommodate a keyboard during a folding process. In addition, the at least one spacing adjustment mechanism 22, through the installation of the fastener 227, allows a user to maintain an original folding posture of the biaxial hinge 20 without adjusting a folding spacing.

Figure 5:
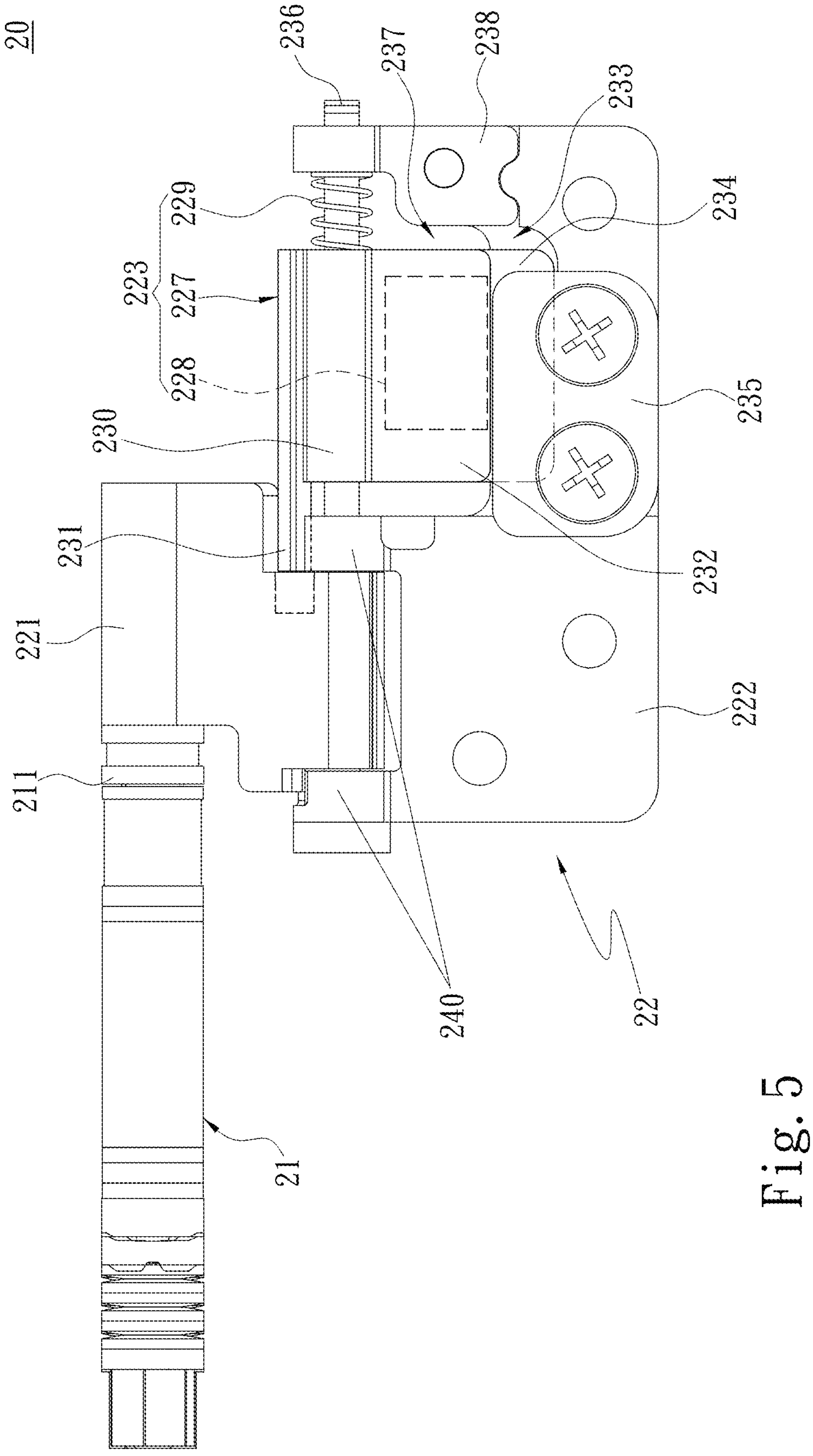
FIG. 5 is a second top view of an embodiment of the invention.
Figure 6:
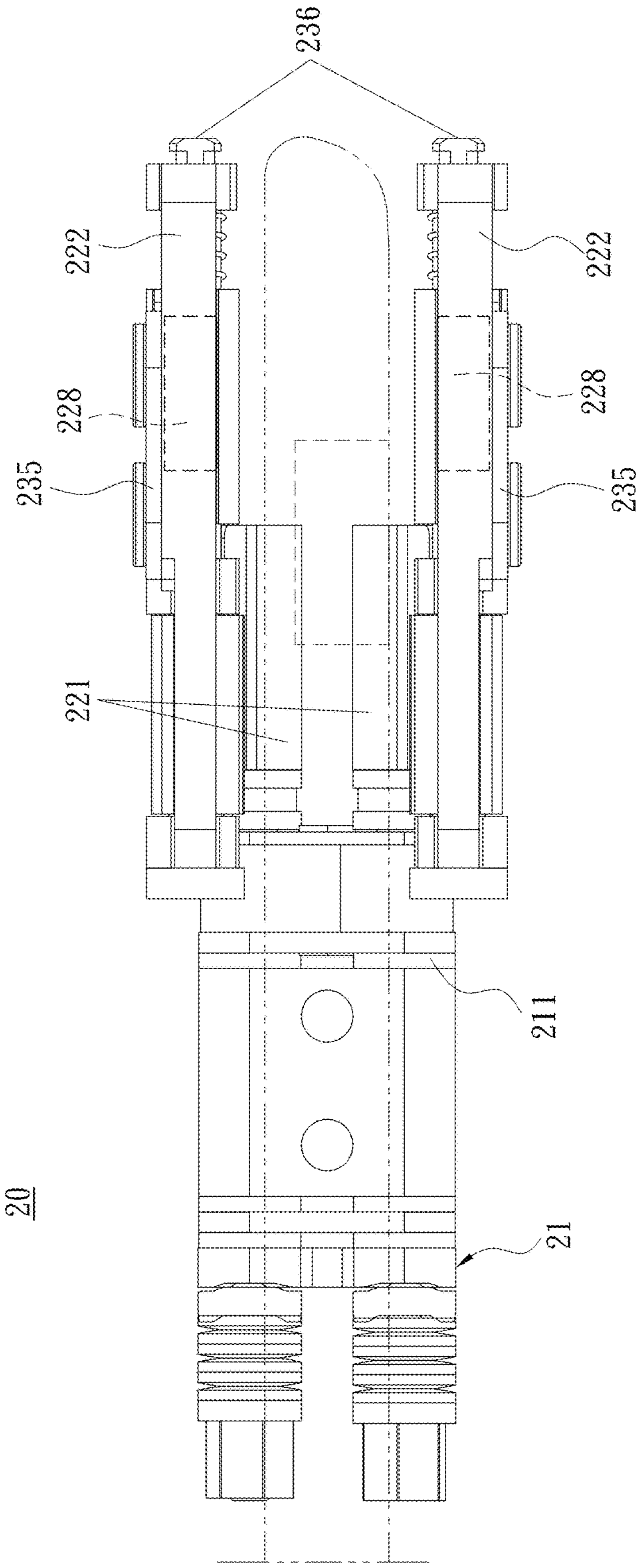
FIG. 6 is a front view of an embodiment of the invention.
Figure 7:
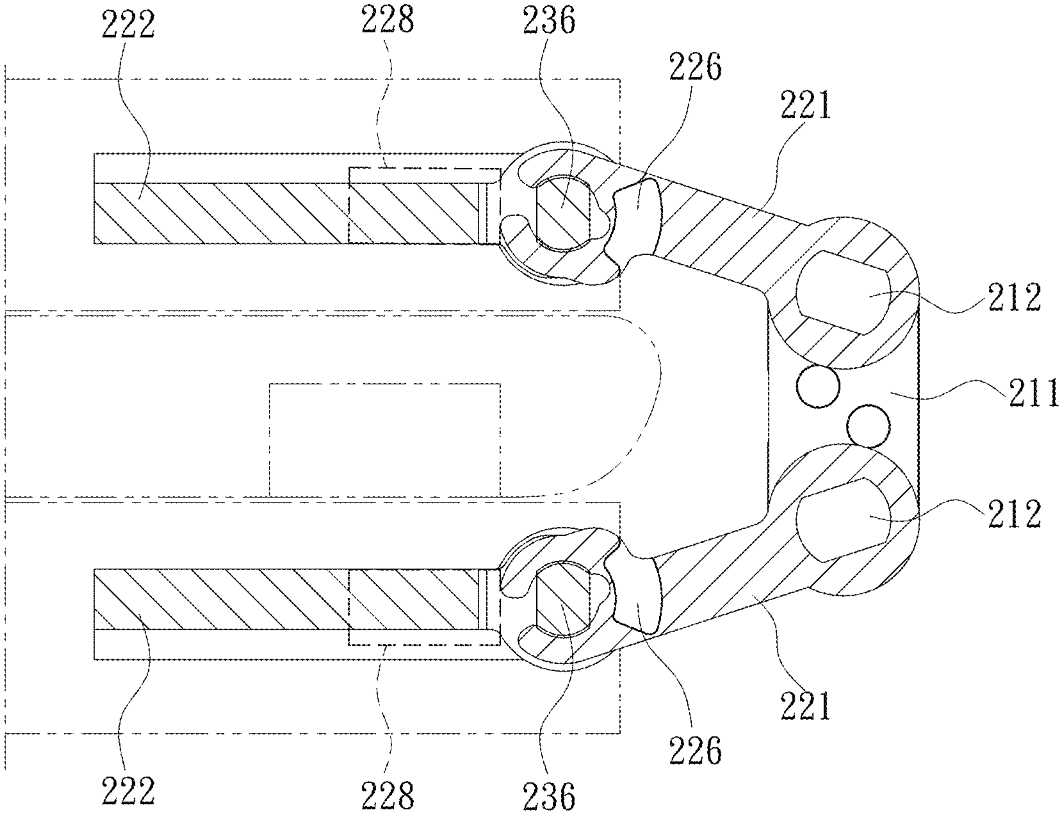
FIG. 7 is a cross-sectional view of an embodiment of the invention.

Please refer to FIG. 5. In one embodiment, the limiting unit 223 includes an elastic reset element 229 that abuts against the fastener 227 and the base 222. When the fastener 227 reaches the second state, the fastener 227 compresses the elastic reset element 229, causing the elastic reset element 229 to store an elastic force. Further, the elastic force stored in the elastic reset element 229 will serve as a source of power to return the fastener 227 to the first state.

Figure 4:
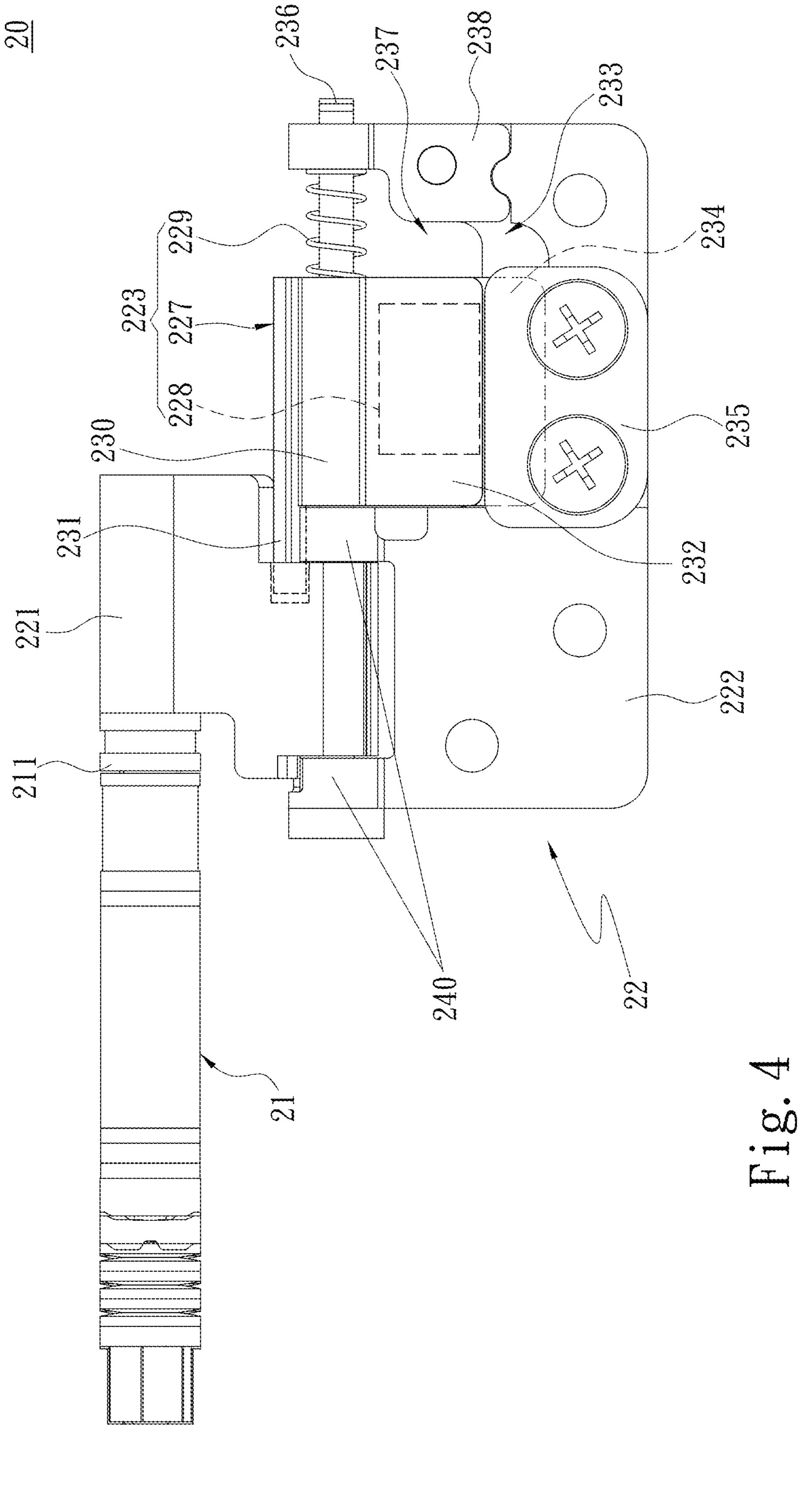
FIG. 4 is a first top view of an embodiment of the invention.

Please refer to FIG. 4. In one embodiment, the fastener 227 is provided with a sliding base 230, a pin 231 connected to one end of the sliding base 230, and a guide block 232 connected to the sliding base 230. In another embodiment, the base 222 is formed with a track 233 provided for disposing the guide block 232. The track 233 enables the guide block 232 to slide therein to assist the fastener 227 in completing switching between the first state and the second state.

Based on the above, in another embodiment, the base 222 includes a step structure 234 and a cover plate 235 connected to the base 222. The step structure 234 and the cover plate 235 jointly form the track 233.

Please refer to FIG. 1, FIG. 2, FIG. 3, FIG. 4, and FIG. 5 again. In one embodiment, the at least one spacing adjustment mechanism 22 further includes a second rotating shaft 236 connected to the connecting rod 221 and the base 222 and provided for disposing the limiting unit 223. Specifically, the second rotating shaft 236 serves as a fulcrum for the base 222 to rotate relative to the connecting rod 221. In addition, the sliding base 230 of the fastener 227 is disposed on the second rotating shaft 236, so that the fastener 227 can be assisted by the second rotating shaft 236 during a process of switching states.

Figure 1:
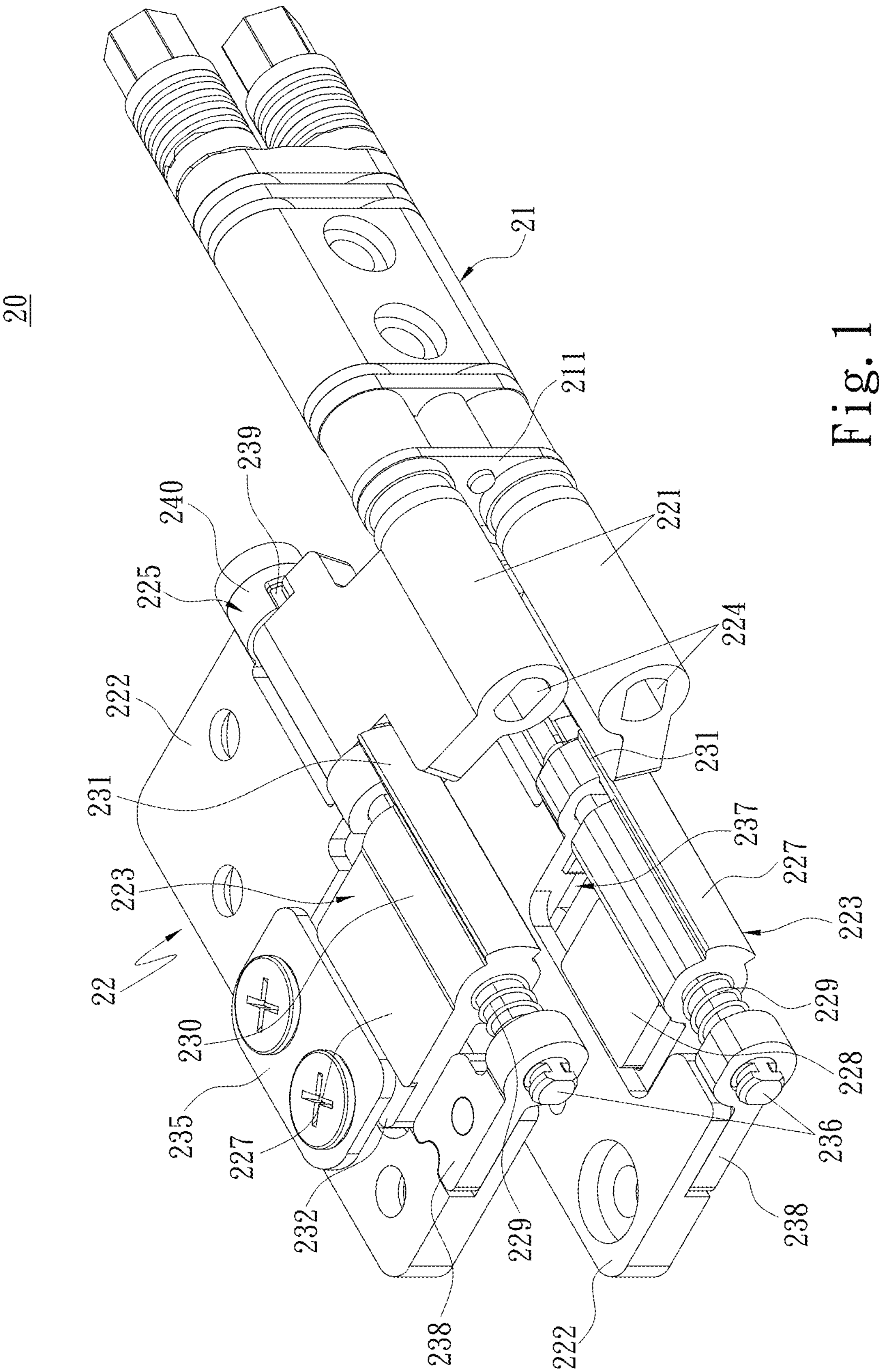
FIG. 1 is a perspective view of the invention.
Figure 2:
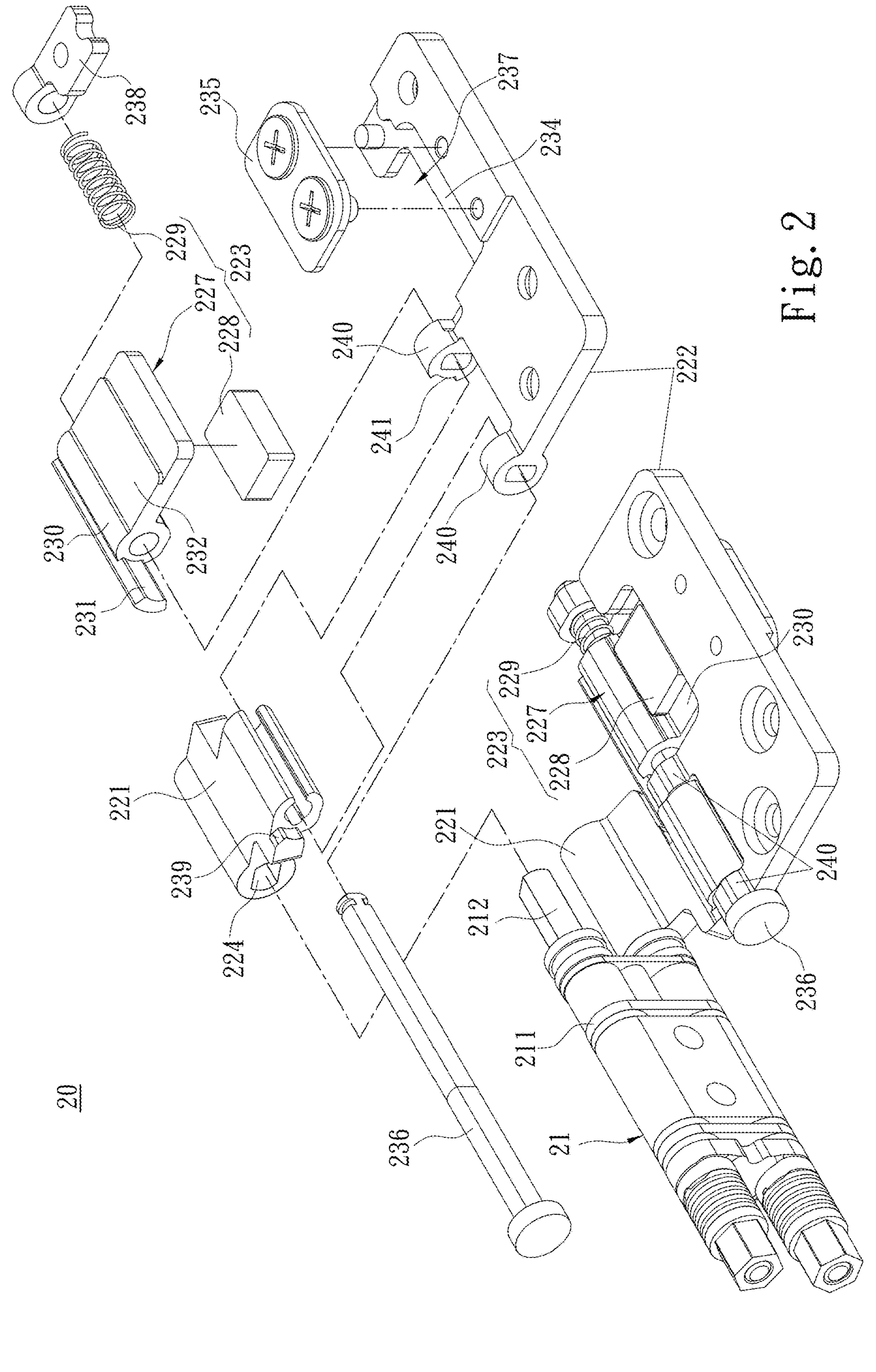
FIG. 2 is a first structural exploded view of the invention.
Figure 3:
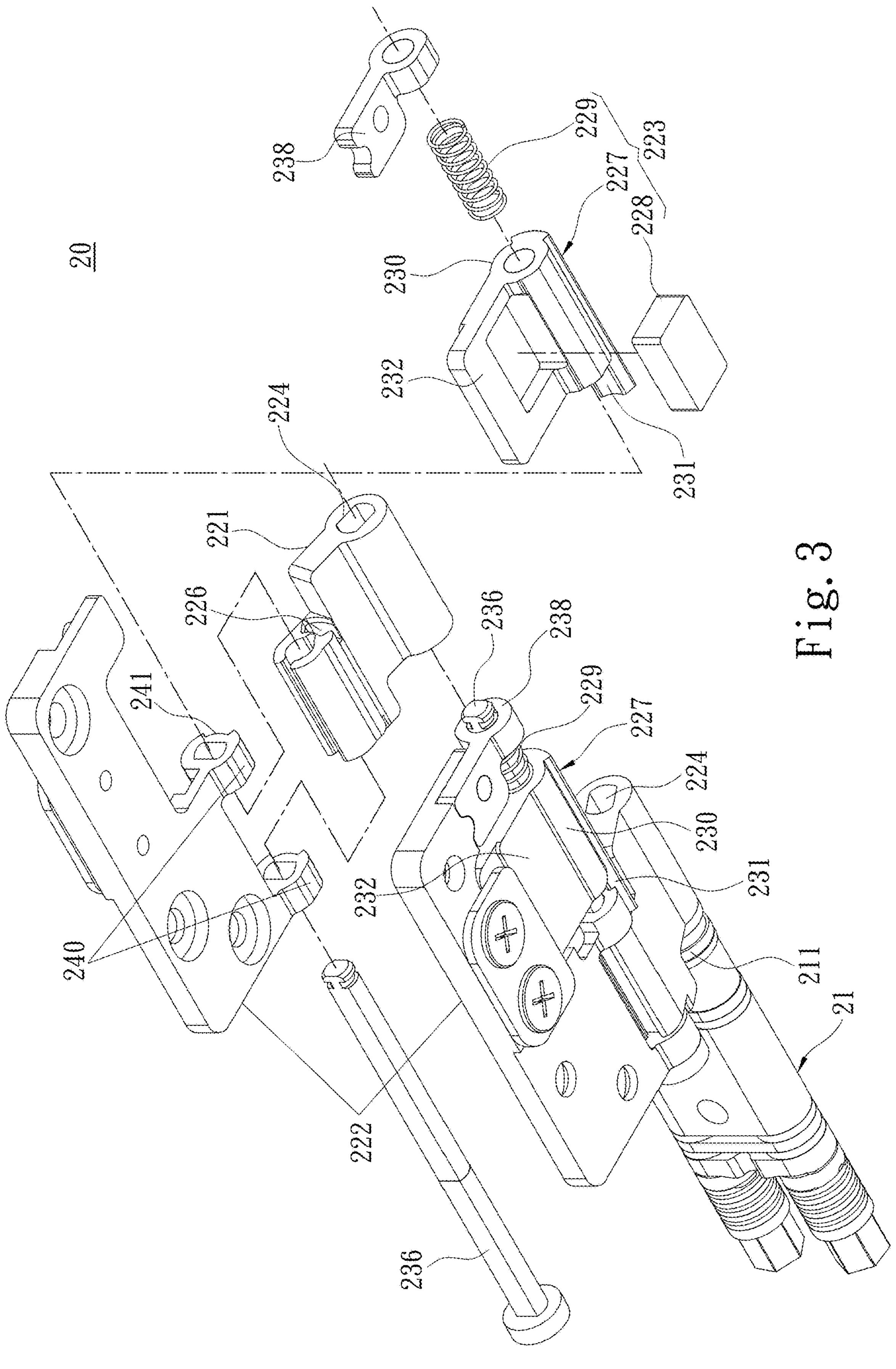
FIG. 3 is a second structural exploded view of the invention.

Please refer to FIG. 2, FIG. 3, and FIG. 4. In one embodiment, the base 222 is formed with an accommodating space 237 that accommodates the limiting unit 223 and is provided for the fastener 227 to slide therein, and one side of the accommodating space 237 is defined by the base 222 as an optionally detachable mounting base 238. The mounting base 238 facilitates an assembly process of the limiting unit 223 and the base 222, providing convenience for the installation of the limiting unit 223.

Please refer to FIG. 1, FIG. 2, FIG. 3, FIG. 4, and FIG. 5 again. In one embodiment, contact surfaces of the connecting rod 221 and the base 222 each include a limiting structure 239. The two limiting structures 239 restrict rotation between the base 222 and the connecting rod 221 to an angular range. On the other hand, when the base 222 rotates relative to the connecting rod 221 within the angular range to reach a limit position, the limiting groove 226 is aligned with the pin 231 of the fastener 227. Further, the fastener 227 can be connected with the limiting groove 226.

Please refer to FIG. 2, FIG. 3, FIG. 4, and FIG. 5. In one embodiment, the base 222 includes two assembly arms 240 connected to the connecting rod 221. One of the two assembly arms 240 is provided with an interface 241 for enabling the pin 231 to move therein.

What is claimed is:

1. A biaxial hinge capable of changing a folding spacing, comprising:

a hinge body comprising a support frame and two first rotating shafts disposed parallelly side by side on the support frame; and at least one spacing adjustment mechanism comprising a connecting rod connected to one of the first rotating shafts and rotating relative to the hinge body, a base connected to the connecting rod and rotating relative to the connecting rod, and a limiting unit disposed on the base, the connecting rod comprising a limiting groove cooperating with the limiting unit, the limiting unit comprising a fastener disposed corresponding to the limiting groove, and a magnetic element connected to the fastener, wherein the fastener is in a first state to contact the limiting groove and restrict a rotation of the base relative to the connecting rod, and the fastener is in a second state to separate from the limiting groove and enable the base to rotate relative to the connecting rod, and when the fastener being in the second state, the biaxial hinge is provided to change the folding spacing, and the magnetic element is acted upon by an external magnetic force to switch the fastener from the first state to the second state.

2. The biaxial hinge capable of changing the folding spacing as claimed in claim 1, wherein the fastener comprises a sliding base, a pin connected to one end of the sliding base, and a guide block connected to the sliding base, the pin optionally contacts the limiting groove when the fastener is switched.

3. The biaxial hinge capable of changing the folding spacing as claimed in claim 2, wherein the base is formed with a track provided for disposing the guide block.

4. The biaxial hinge capable of changing the folding spacing as claimed in claim 3, wherein the at least one spacing adjustment mechanism further comprises a second rotating shaft connected to the connecting rod and the base and provided for disposing the limiting unit.

5. The biaxial hinge capable of changing the folding spacing as claimed in claim 3, wherein the base comprises a step structure and a cover plate connected to the base, the step structure and the cover plate jointly form the track.

6. The biaxial hinge capable of changing the folding spacing as claimed in claim 5, wherein the base is formed with an accommodating space for accommodating the limiting unit, and one side of the accommodating space is optionally detachable, as defined by the base.

7. The biaxial hinge capable of changing the folding spacing as claimed in claim 1, wherein contact surfaces of the connecting rod and the base each comprise a limiting structure.

8. The biaxial hinge capable of changing the folding spacing as claimed in claim 2, wherein the base comprises two assembly arms connected to the connecting rod, and one of the two assembly arms is provided with an interface for enabling the pin to move therein.

9. The biaxial hinge capable of changing the folding spacing as claimed in claim 1, wherein the limiting unit comprises an elastic reset element that abuts against the fastener and the base, and the elastic reset element enables the fastener to return to the first state.

* * * * *